United States Patent [19]
Bauer

[11] Patent Number: 5,158,004
[45] Date of Patent: Oct. 27, 1992

[54] BRAKE POWER BOOSTER, IN PARTICULAR FOR AUTOMOTIVE VEHICLES

[75] Inventor: Juergen Bauer, Wiesbaden, Fed. Rep. of Germany

[73] Assignee: Alfred Teves GmbH, Frankfurt am Main, Fed. Rep. of Germany

[21] Appl. No.: 634,170

[22] PCT Filed: Mar. 24, 1990

[86] PCT No.: PCT/EP90/00480

§ 371 Date: Dec. 17, 1990

§ 102(e) Date: Dec. 17, 1990

[87] PCT Pub. No.: WO90/12716

PCT Pub. Date: Nov. 1, 1990

[30] Foreign Application Priority Data

Apr. 25, 1989 [DE] Fed. Rep. of Germany ....... 3913536

[51] Int. Cl.⁵ .............................................. F15B 9/10
[52] U.S. Cl. ................................................ 91/369.2
[58] Field of Search .................... 91/369.1–369.4, 91/376 R

[56] References Cited

U.S. PATENT DOCUMENTS

| | | | |
|---|---|---|---|
| 4,583,446 | 4/1986 | Morimoto | 91/369.2 |
| 4,587,884 | 5/1986 | Tsubouchi | 91/376 R |
| 4,757,748 | 7/1988 | Kawasumi et al. | 91/369.2 |
| 4,813,338 | 3/1989 | Mortimer et al. | 91/376 R |
| 4,882,980 | 11/1989 | Arino et al. | 91/369.2 |

FOREIGN PATENT DOCUMENTS 3113271 10/1982 Fed. Rep. of Germany ..... 91/369.2

OTHER PUBLICATIONS

Kalpakjian, S. "Deep Drawing" in Encyclopedia of Materials Science and Engineering (copyright 1986) vol. 2 pp. 1024–1026.

*Primary Examiner*—Edward K. Look
*Assistant Examiner*—F. Daniel Lopez
*Attorney, Agent, or Firm*—Robert P. Seitter; J. Gordon Lewis

[57] ABSTRACT

A brake power booster for automotive vehicles has a booster housing sealingly subdivided by one or more axially movable walls into one or more vacuum chambers and one or more working chambers, wherein a push rod is protected against dropping out of its assembled position, by integral retention features formed in a bowl-shaped insert member that receives the reaction plate. The insert member is received in a recess of the control valve housing and is held therein by a resetting spring which reacts against radially outwardly extending tabs on the insert member. Indentations, sheared-in depressions or radially inwardly extending tabs serve as alternate forms of the retention features.

8 Claims, 2 Drawing Sheets

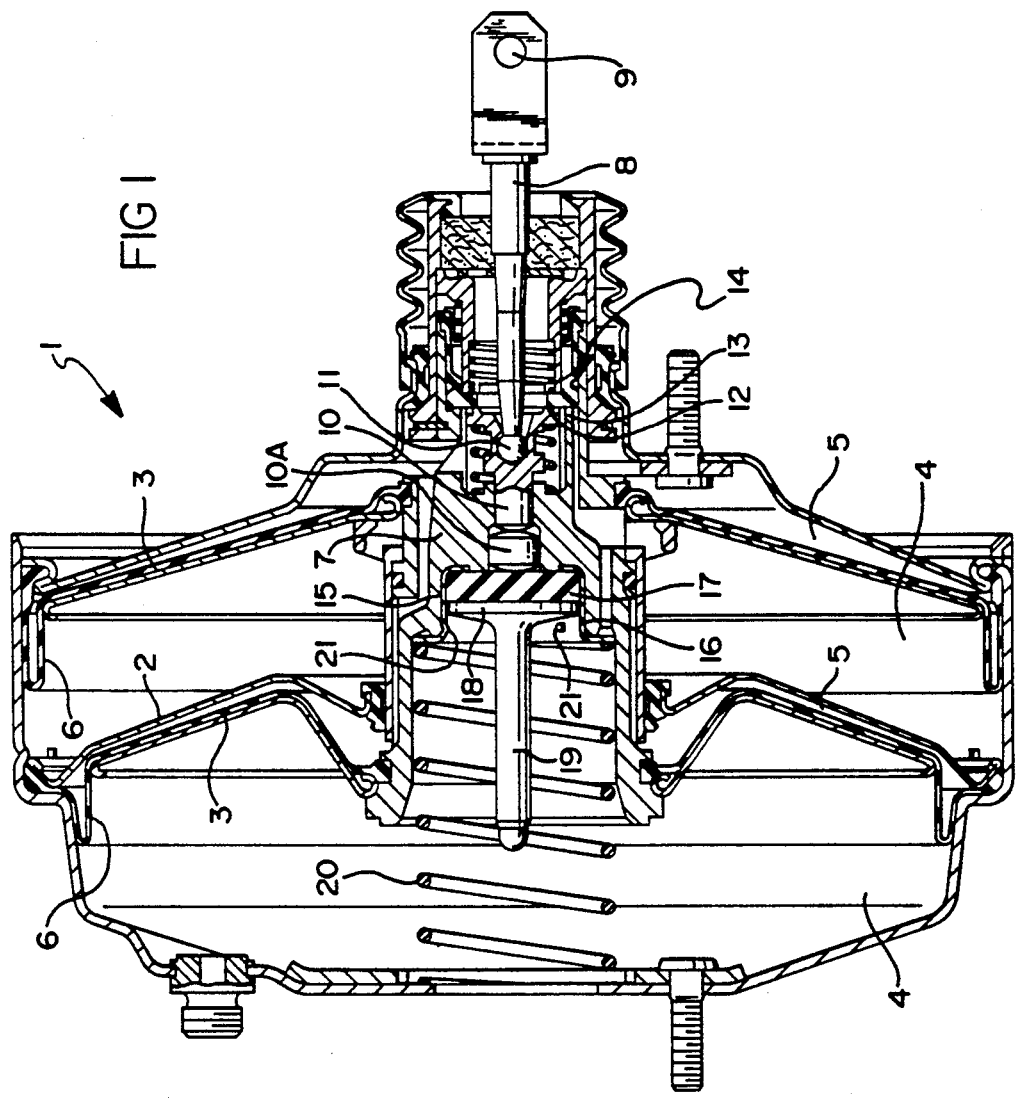

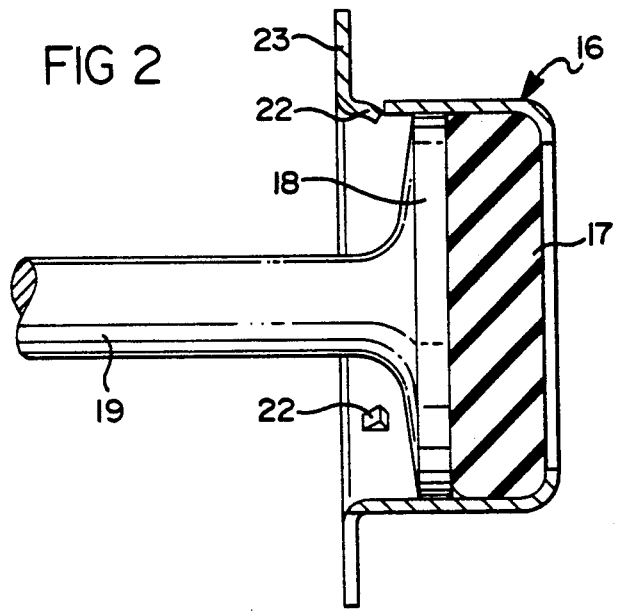
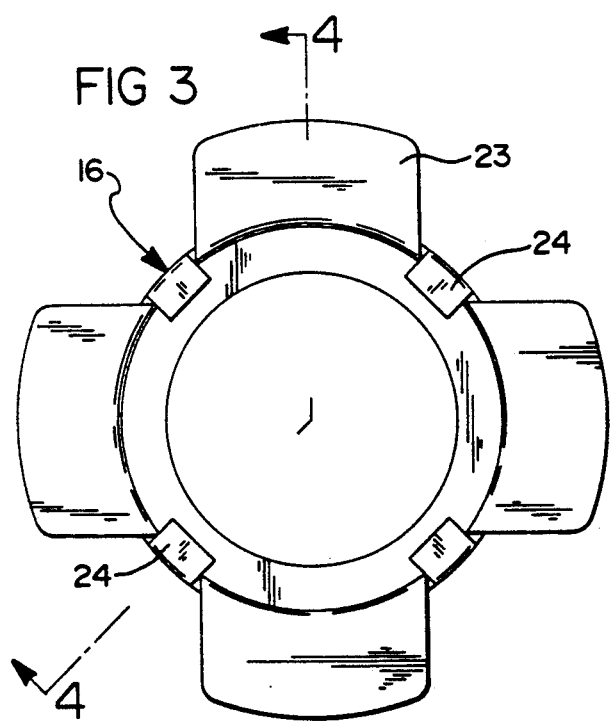
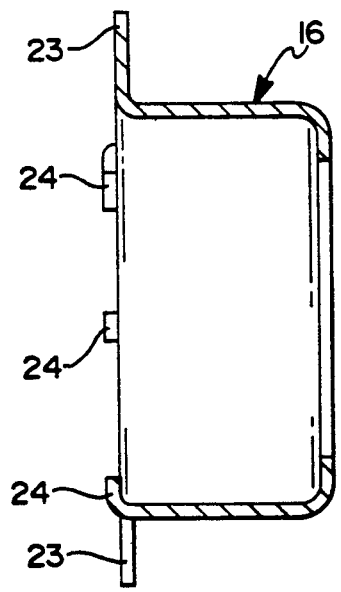

BRAKE POWER BOOSTER, IN PARTICULAR FOR AUTOMOTIVE VEHICLES

INTRODUCTION

The present invention relates to a brake power booster, in particular for automotive vehicles, comprising a booster housing which is sealingly subdivided by at least one axially movable wall into at least one vacuum chamber and at least one working chamber, having a resetting spring placed in the vacuum chamber on the master-cylinder side and a mechanically actuatable control valve to connect the working chamber to the vacuum chamber and/or to the atmosphere, the control valve housing thereof being rigidly coupled to the movable wall, with a rubber-elastic reaction plate, which abuts on a head flange of a push rod nd which transits the brake force onto an actuating piston of a master cylinder fitted to the booster housing on the vacuum side, being arranged in a bowl-shaped insert member which latter is placed in a recess of the control valve housing whose walls extend beyond the head flange on the master-cylinder side and whose bottom is facing the control valve housing.

BACKGROUND OF THE INVENTION

Brake power boosters of the species with retaining arrangements to prevent drop out of the push rod are known in most various designs, e.g. from the applicant's older application DE-OS 37 09 172. Clamping rings, plastic rings fastened by ultrasonic sealing or gluing, or sheared-in metal rings are used as retaining means. In any case, there is the need to mount at least one additional component part. This is expensive and complicates the assembly.

SUMMARY OF THE INVENTION

It is, therefore, the object of the instant invention to provide a brake power booster wherein the push rod is prevented from dropping out in a simple manner lending itself to low-cost manufacture, there being taken into account in particular the possibility of a partly automated production as well as the special assembly problem in respect of master cylinders integrated into the brake power booster by way of preassembly of individual groups of component parts.

This object is achieved by a blow-shaped insert member which receives the reaction plate and including positively integrally formed, acting retention features acting to prevent the push rod from dropping out of the insert. Engagement of the insert by a resetting spring arranged in the pressure chamber holds the insert itself in a recess in the control valve housing. The integrally forned retention features allow preassembly of the push rod, reaction plate and insert member outside of the booster and hence permits an automated production as well.

Retaining noses, indentations or sheared-in depressions formed in the insert member on the master-cylinder side serve as retention features to secure the push rod flange in the insert. In a favorable manner, several circumferentially spaced tabs may be shaped at the insert member on the side closest to the master cylinder, the tabs serving as an abutment surface for the resetting spring. This simple measure permits mounting the insert member without other complicated attachments. The assembly, too, is very simple.

A particularly inexpensive embodiment of this invention provides that the insert member is formed as a sheet-metal stamped piece.

Possible embodiments of the present invention are described with reference to the accompanying drawings.

BRIEF DESCRIPTION OF THE DRAWINGS

FIG. 1, is an axial cross-section taken through a tandem-type brake power booster with a bowl-shaped insert member;

FIG. 2, shows an axial cross-section through another embodiment of the insert member, as well as the reaction plate and the push rod;

FIG. 3, is a top view of a third variant of the insert member; and

FIG. 4, shows the variant of the insert member shown in FIG. 3 in a cross-section taken along the line marked therein.

DETAILED DESCRIPTION OF THE PREFERRED AND ALTERNATIVE EMBODIMENTS

FIG. 1 illustrates a booster housing 1 which is subdivided by a rigid wall 2 and two movable walls 3 into two vacuum chambers 4 and two working chambers 5. Each movable wall 3 is sealed in relation to the booster housing 1 by means of a rolling diaphragm 6. Projecting into the booster housing 1 is a tubular control valve housing 7 which is axially penetrated by a piston rod 8. One end of piston rod 8 is formed by a lug 9 for articulation with a non-illustrated actuating pedal, while the other end thereof forms a ball head 11 extending into a valve piston 10. Valve piston 10 defines a valve seat 12 which is coating with a second valve seat 13 and a poppet valve 14. The pressure in working chambers 5 is controllable by poppet valve 14 and the two valve seats 12, 13. The control valve housing 7 is formed with a recess 15 into which a bowl-shaped insert member 16 is fitted. Insert member 16 includes a cylindrical section which receives a reaction plate 17 and a head flange 18 of a push rod 19 which transmits the pneumatically boosted brake force onto a non-illustrated master cylinder. Insert member 16 is held by a resetting spring 20 arranged in vacuum chamber 4 on the master cylinder side, and biases the control valve housing 7. Integrally formed Indentations 21 are provided on the cylindrical section of the insert member 16 are located axially beyond the reaction plate 17 and head flange 18 by the greater depth of the cylindrical section of the insert member 16 to secure the head flange of the push rod 19 against dropping out of its illustrated position within the cylindrical section of the insert member 16 and against the end wall thereof.

FIG. 2 shows in an axial cross-section only the insert member 16 with the reaction plate 17 and the head flange 18 as well as the push rod 19. Sheared-in depressions 22 are formed into the cylindrical section of the insert member 16 for securing the head flange 18. From this enlarged view tabs 25 forming a circumferentially segmented flange are also discernible on which the resetting spring acts (20 in FIG. 1).

The tabs 23 can be seen clearly in a top view in FIG. 3 as well as the inwardly projecting tabs 24 which serve as a means for securing the push rod 19 in position. The circumferential spacing of both the outward tabs 23 and the inward tabs 24 create breaks along the circumference direction in order to safeguard proper functioning of the brake power booster. This necessitates connecting ducts between the vacuum chambers 4 and the working chambers 5 which rae opened or closed by way of the poppet valve 14 and the valve seats 12, 13.

FIG. 4 shows in the cross-section taken along the line marked in FIG. 3 once more the same embodiment of this invention. One may see the outward tabs 23 formed on the insert member 16 as well as the inward tabs 24 preventing the push rod 19 from dropping out.

What is claimed is:

1. A brake power booster adapted for use with a master cylinder for automotive vehicles, for boosting the brake pedal force applied to an actuator piston included in said master cylinder, said power booster comprising:
    a booster housing having said master cylinder fitted to one side thereof, said booster housing sealingly subdivided by at least one axially movable wall defining at least one vacuum chamber and at least one working chamber;
    a resetting spring disposed in the vacuum chamber on a side thereof adapted for placement adjacent said master-cylinder; and
    a mechanically actuatable control valve having valve seats operative to selectively connect the working chamber with the vacuum chamber and the atmosphere, the control valve including a control valve housing coupled to said movable wall, a brake pedal actuated valve piston slidably mounted within a bore in said control valve housing, an elastic reaction plate having one and another side, transmitting means transmitting a force exerted by said valve piston to said one side of said reaction plate, a push rod for transmitting brake force onto said actuating piston of said master cylinder, said push rod having a head flange abutting said another side of said reaction plate, a recess in said control vale housing coaxial with said valve piston but facing said master cylinder, a bowl-shaped insert member disposed in said recess of said control valve housing, said insert member having a cylindrical end section receiving said push rod head flange and said reaction plate, said insert member having an end wall at one end of said cylindrical section abutting said the bottom of said recess in said control valve housing, said insert member cylindrical section being of greater axial depth than said reaction plate and said head flange, retention features integrally formed on said insert member located axially beyond said head flange and reaction plate and extending radially inward from said cylindrical section retaining said head flange within said insert member, said end wall of said insert member having an opening exposing said one side of said reaction plate to enable engagement by said means transmitting, said valve piston and said transmitting means both unattached to said insert member to be freely separable from said insert member to allow separate assembly of said insert member, reaction plate, and push rod.

2. A brake power booster as claimed in claim 1, wherein said insert member is formed with a portion extending radially outwardly rom said cylindrical section at the other end from said end wall defining a thrust surface, said booster including said resetting spring engaging said radially outward extending portion acting to force said insert member into said control valve housing recess.

3. The brake power booster according to claim 2, wherein said valve housing includes an end portion through which said bore extends said portion, protruding through said opening in said end wall of said insert member and urged into engagement with said reaction plate by said return spring.

4. A brake power booster as claimed in claim 1, wherein said retaining means comprise indentations formed into said cylindrical sections protruding radially inwardly therefrom.

5. A brake power booster as claimed in claim 1, wherein said retaining means comprise sheared-in depressions formed into said cylindrical section.

6. A brake power booster as claimed in claim 1, wherein said insert member comprises a drawn sheet-metal piece.

7. A brake power booster as claimed in claim 1, wherein said retaining features comprise a plurality of radially inwardly extending tabs formed about the perimeter of said cylindrical section on the other end thereof from said end wall.

8. The brake power booster according to claim 7 further including a series of radially outwardly extending circumferentially spaced tabs also formed on said cylindrical section other end, interspaced between said radially inwardly extending tabs, said power booster also including a resetting spring having one end acting on said radially outwardly extending tabs to force said insert member into said control valve housing recess.

* * * * *